July 31, 1956  J. G. D. MANWARING  2,757,266
APPARATUS FOR VULCANIZING OR HEATER DIELECTRIC MATERIALS
Filed Feb. 14, 1952  2 Sheets-Sheet 2

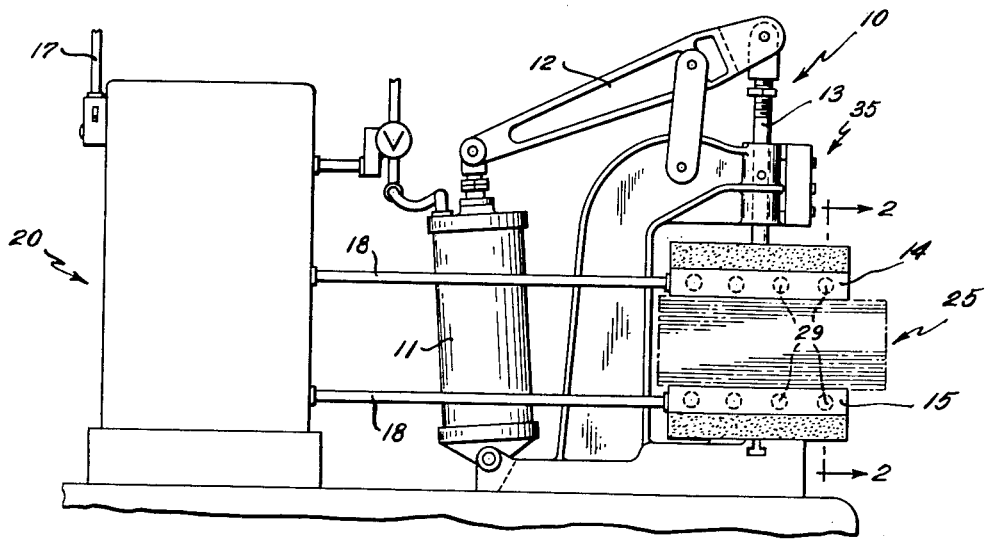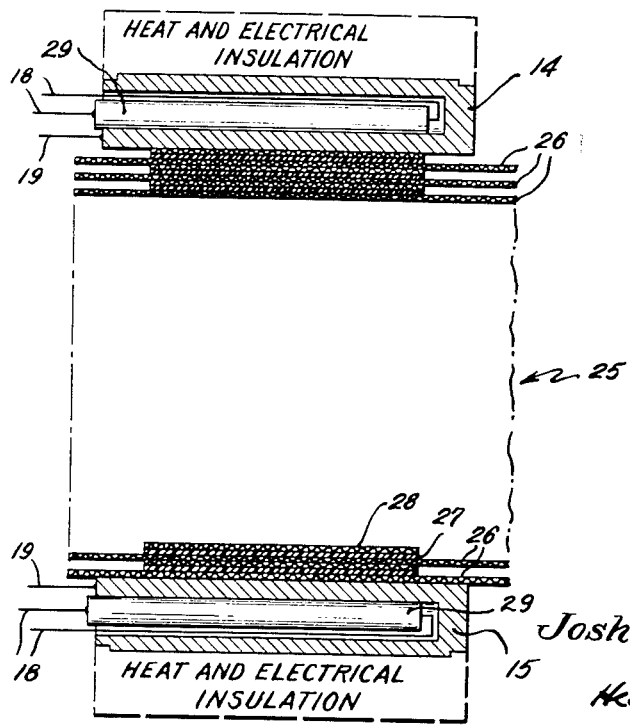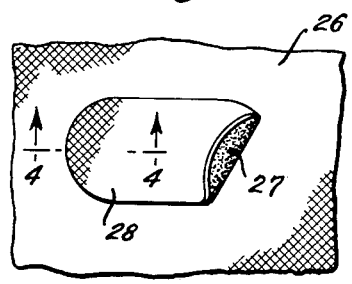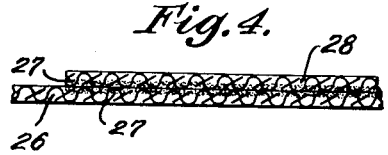

INVENTOR.
Joshua G. D. Manwaring,
BY
Heard, Smith, Porter & Chittick
Attys.

United States Patent Office 2,757,266
Patented July 31, 1956

2,757,266

APPARATUS FOR VULCANIZING OR HEATING DIELECTRIC MATERIALS

Joshua G. D. Manwaring, Medfield, Mass., assignor to Miles Manufacturing Corporation, Medfield, Mass., a corporation of Massachusetts Application February 14, 1952, Serial No. 271,627

11 Claims. (Cl. 219—10.47)

This invention relates to apparatus for vulcanizing or heating dielectric materials, which comprises high frequency and conduction heating of the dielectric materials in a novel manner and has for its object to produce an improved apparatus suitable for this purpose.

As an illustration of the type of work the machine is capable of doing, the machine is shown being used for heat sealing or vulcanizing rubber reinforcing patches to overalls, but it is to be understood that the machine is capable of vulcanizing and heating many other articles such as neoprene, silicon, etc. and of being used for other purposes. The apparatus most suitable for this purpose is a novel combination of press having heated platens, and a high frequency generator as a source of current for dielectric heating of the load between the platens. The load or work charge can be a single piece of material, or a stack of a number of layers of similar or dissimilar, materials including metal platens or dielectric separators used to provide desired surface finish, etc. In applying reinforcing patches to overalls, the fabric patches, either precoated or with a separate sheet of rubber or plastic, are placed with the fabric leg fronts in a multi-layer stack many plies high, and all are cured simultaneously. Initial heating of the outer layers is by conduction from the resistance-heated press platens, and is followed by heating of the entire load by high frequency radiation. The conduction heating is continued during the high frequency heating, and even after it is shut off.

The heating by conduction high frequency current is preferably thermostatically and automatically controlled and the process is preferably provided with complete automatic cycle control.

In using the apparatus for applying reinforcing patches to overalls, and for curing them while in a stack, the cycle time is balanced to provide uniform cure. The apparatus combines resistance and electrostatic heating, thermostatically and automatically controlled to provide uniform heating for the complete load in the press. A load heated by conduction, or resistance heating, alone will be hotter in the top and bottom layer than in the middle layers, because of their nearness to the heating platens. The electrostatic or high frequency heating results in a load hotter in the middle and toward the center rather than on the top and bottom layers and outside, because of surface radiation. By combining internal heating by radio frequency and external heating by resistance the entire load can be equally and uniformly heat treated at the desired temperature and for the desired time. An advantage of thus combining conductive and high frequency electrical heating is that in my press it is possible to cure a stack of twelve or more overall leg fronts and knee patches in the same time normally required to cure a single patch in a conductive or resistance-heated platen press. Likewise an electrostatic or high frequency heated press will cure the center of several plies, and an added platen heater will prevent the top and bottom and outside surfaces of the stack from cooling off and being undercured. Similarly, material to be preheated for further processing can be brought up to its desired temperature uniformly and held at that temperature indefinitely until needed, by adjusting the cycle control to turn off the radio frequency at the right moment and to hold the load in a closed press with all sides conductively heated.

In the conventional conduction press which heats the outer layers first vlucanizing begins at the surface and then hardens the exterior so that the surface becomes relatively hard and any gases generated cannot easily escape and therefore cause porosity or form blisters. By combining internal heating by radio frequency with the external conduction heating the inner parts are brought up to temperature as rapidly as the outer and any generated gases are free to escape through the soft surface layers before they harden.

The uniform heat treatment improves the age resistance of the rubber or plastic by avoiding over cure of the outer layers. In fact the bonding strength of the rubber appears favorably affected throughout by this method of cure.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed beyond the requirements of the prior art.

Other advantages and novel features of my apparatus appear below in the specification and accompanying drawings, in which:

Fig. 1 is a side elevation of my apparatus;

Fig. 2 is an enlarged vertical section on line 2—2 of Fig. 1;

Fig. 3 is an plan view of a patch to be applied to a garment;

Fig. 4 is an enlarged section on line 4—4 of Fig. 3; and

Figure 5:
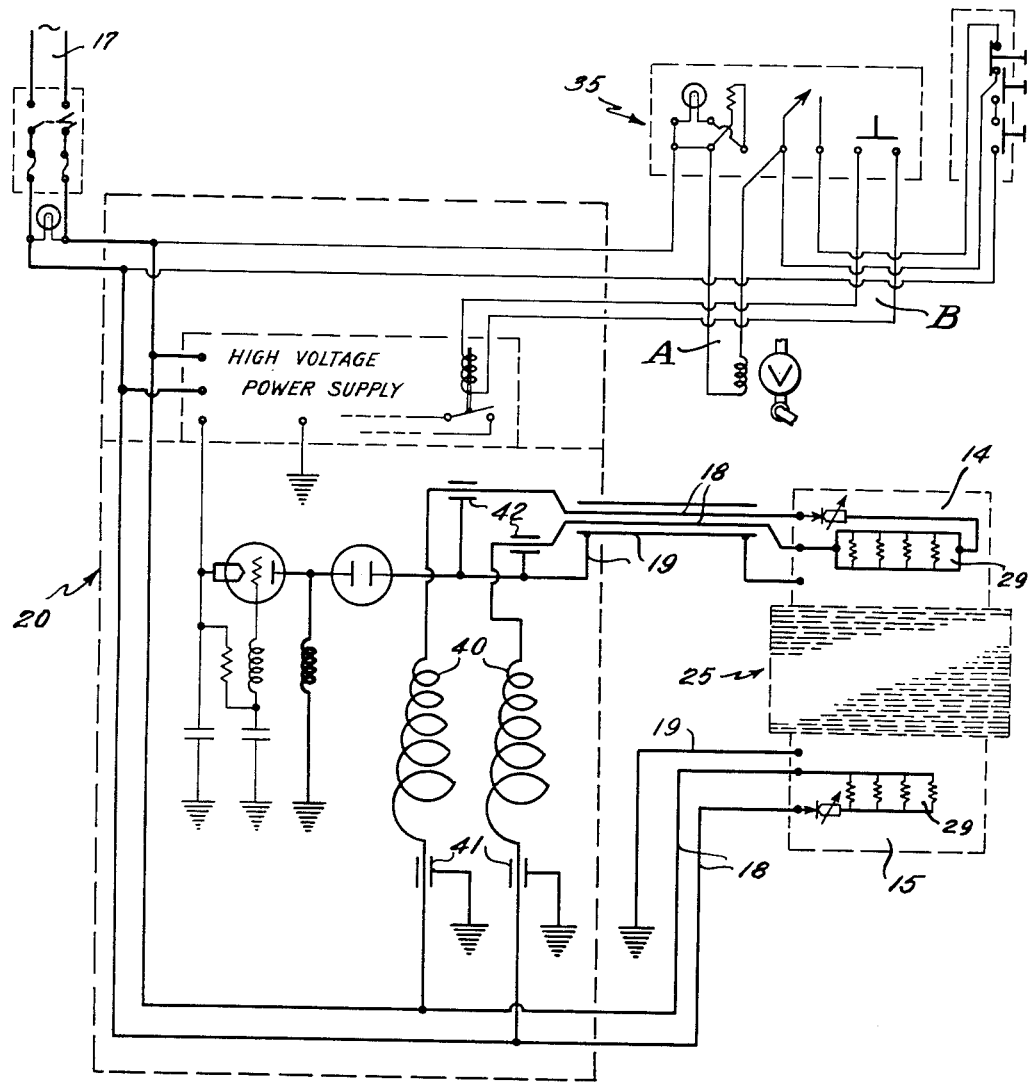
Fig. 5 is a schematic wiring or circuit diagram for my apparatus.

In the drawings 10 represents generally a conventional type of arbor press, operated by compressed air, in which 11 represents the compressed air cylinder, 12 a rocking arm and 13 the ram, and which press is provided with a top platen 14 and bottom platen 15. But it will be understood that the pressure applied by the press may be of any suitable nature and obtained from compressed air, liquid, mechanical or other means adapted to the requirements of the material being treated. A conventional high frequency generator is shown at 20. The top and bottom platens 14 and 15 are preferably resistance heated by electricity conducted thereto by feed lines 18, and high frequency electric current is simlarly conveyed to the platens 14 and 15 from the high frequency generator 20 through the feed lines 19 coaxial with lines 18. One of the high frequency lines may be at ground potential as indicated in Fig. 5, or both high frequency feeds may be above ground potential, as indicated in Figs. 1 and 2. The platens 14 and 15 then act as electrodes. A source of electric current 17 supplies electricity to the generator 20. The dielectric material constituting the load or work charge is held between the two platens 14 and 15 and is generally designated at 25. As shown in the drawings the load or work charge is a stack of fabric leg fronts of overalls shown at 26 to which fabric patches 28 are applied and then vulcanized thereto by means of a rubber coating 27, as shown in Fig. 2, or which may be a separate coating or sheet as shown on Fig. 2. It will be understood that steel separator plates (not shown) may also be placed if desired between each ply or sandwich of overall, fabric patch, and intermediate rubber layer to provide a smoother finish. Other types of interleaves might be employed as for example teflon for separating purposes or polythene for separation and low overall radio frequency loss characteristics.

In securing the plastic or rubberized fabric patches onto the fabric, considerable pressure is applied to force the rubber or plastic into the interstices of the fabric to obtain maximum adhesion and to insure complete molding. If desired, and particularly in preheating operations, the top and bottom platens 14 and 15 may be augmented by providing heated insulated side panels, which may be heated in any suitable manner as by resistance coils, infra red lamps and the like, to provide heat for the sides below as well as the top and bottom. When so equipped the platens form a complete adiabatic blanket to permit uniform processing under completely homogeneous conditions. The top and bottom platens 14 and 15 may be conductively heated from any convenient type of heat source, such as steam, hot air, hot water, hot oil, liquid solids, or by gaseous fuels, without departing from my invention. Preferably, however, the platens 14 and 15 are heated by electrical resistance. The conductive heating of heating elements 29 located in the platens 14 and 15 is preferably thermostatically controlled by self-contained thermostats which are connected through an automatic cycle control shown generally at 35. The electric current for heating the platens may be connected during the entire cycle if the circuit is suitably arranged, or may be connected only during that portion of the cycle when the high frequency heating current is disconnected. But preferably the electric current for heating the platens will be continuously connected, and thermostatically controlled. Resistance-heated side shield units are optional.

An important feature of my apparatus lies in the means of providing the resistance heating current to the high potential platens 14 and 15, by introducing it along the neutral axis of coaxial, high potential radio frequency leads 19. Introducing electric current for resistance heating units presents no problem on those platens, side shields and the like, which are at ground potential in reference to the high frequency dielectric heating source. But introduction of electric current to resistance heating units that are above ground potential presents a real problem, in that a direct electrical connection for the resistance heating current must be provided without providing a high frequency path and without changing the high frequency constants. Thus one end of the low frequency resistance heating conductor must be dead as far as high frequency is concerned and the other end must be at high frequency potential. The introduction of the low frequency current must in no way affect the application and use of the high frequency in any manner.

I have solved this problem by introducing the resistance heating current to the platens along the neutral axis of the coaxial, high potential, radio frequency leads 19. The 60 cycle A. C. is brought to the "hot" (high potential platen) through radio frequency chokes 40 of sufficient inductance, so that this inductance in parallel with the platent capacitance has a fundamental frequency somewhat lower than the operating frequency, but not so low that the capacitance of the inductance introduces problems. The pair of radio frequency chokes 40 shown on the wiring diagram, Fig. 5, are grounded at both ends through by-pass capacitors 41 and 42. One pair of ends goes to ground via the capacitors 41, and the other ends terminate on the high potential lead through the capacitors 42. The alternating resistance current on the high frequency lead 19 is conducted through the heater cord 18 along the neutral axis of the coaxial cable, as previously stated. The inductance 40 used has an absolute minimum of capacitance by reason of the turns being supported at two small points at the extremities of each turn. The turns are widely spaced and the air insulation has no loss and a minimum capacitance. The inductance has sufficient extra turns so that it will not resonate with any load which might conceivably be applied.

The operation of my device is best explained from the wiring diagram shown in Fig. 5. It will be understood that electricity is fed into the generator 20 through line 17, and there converted to desired radio frequency, which travels by coaxial cable 19 to the platens 14 and 15. Simultaneously resistance heating current is supplied to the resistance elements in the platens through lines 18. The cycle controller 35 has a minimum of two circuits, circuit A being used to close the press platens before the high frequency current is applied, and to open them after the high frequency current has been turned off. Circuit B is used to start the flow of high frequency current after the platens are closed, and to stop it before the platens are opened. One or more additional timed circuits may be used as desired for alternative control schedules for press or generator, or any or all of the resistance heated platens or sides. The time schedule is adjustable for optimum overall cycle and inter-relation of functions.

With my apparatus provided with complete automatic cycle control, shown generally at 35, the operator merely pushes a pair of series starting buttons simultaneously, and the control takes over. Thereafter the press is automatically closed, the resistance heating is turned on and subsequently the high frequency heating is turned on, the heating schedule is completed and the high frequency heating current is turned off, and the press is opened with or without dwell. As previously stated, the resistance heated top and bottom platens 14 and 15 may be continuously connected and thermostatically controlled during the entire heating cycle and dwell, as well as while the press is idle.

I claim:

1. Apparatus for heating dielectric materials comprising a press having first and second platens for holding the dielectric material, a source of radio frequency power, means connecting said source of radio frequency power to said first and second platens, a source of low frequency alternating current, means connecting said source of low frequency alternating current to first and second electrical heating means located in said first and second platens respectively, said last mentioned connecting means including a radio frequency choke capacitively grounded to said source of high frequency power whereby to render said connecting means neutral to radio frequency voltages occurring in the same locality.

2. Apparatus for bonding dielectric materials comprising a press having an upper platen and a lower platen, a high frequency oscillator, means connecting said oscillator to said upper platen and said lower platen whereby a complete high frequency circuit is provided through said platens, a source of low frequency power, means including a high frequency choke coil grounded to high frequency power coupling said low frequency power to a first electrical heating element in one of said platens, and means connecting said low frequency power to a second electrical heating element located in the other of said platens.

3. Apparatus for heating dielectric materials comprising first and second platens between which the dielectric materials may be placed to be heated, a radio frequency oscillator, first and second means connecting said oscillator to said first and second platens respectively whereby radio frequency energy is applied to said platens effective to heat said dielectric materials, first and second electrical heating elements associated with said first and second platens respectively, a source of electric current for energizing said heating elements, means including a radio frequency choke connecting said source of electric current to said first heating element, means connecting said second heating element to said source of electric current in parallel to said first heating element, and capacitor means providing a path for radio frequency energy connected between said means connecting said oscillator to said platens and said means connecting said source of electric current to said electrical heating elements whereby said heating elements are short circuited with respect to radio frequency energy.

4. Apparatus for bonding dielectric materials comprising first and second platens for holding the dielectric material, an electrical heating element mounted in each of said platens, a source of low frequency power, conducting means including choke means presenting a high impedance to radio frequency energy connecting said heating elements to said source of low frequency power, a source of radio frequency power, means for conducting radio frequency power connecting said radio frequency power source to said platens, and means providing a low impedance path for radio frequency power connected between said conducting means for said low frequency power and said conducting means for said radio frequency power, whereby said heating elements are short circuited with respect to radio frequency power.

5. Apparatus for heating dielectric materials comprising first and second platens each carrying an electrical heating element, a source of electric current for heating said heating elements, first conductive means connecting said current source to said heating elements, a source of high frequency power, second conductive means connecting said source of high frequency power to said first and second platens, whereby said platens act as electrodes for said high frequency power, means for short circuiting high frequency power between said first and second conductive means whereby no high frequency potential exists between said first and second conductive means, and a choke connected in the circuit of said heating element and said source of electric current presenting a high impedance to radio frequency power and a low impedance to said electric heating current.

6. Apparatus of claim 5 further including thermostatic means for controlling the supply of said electric current to said heating elements and the supply of said high frequency power to said platens.

7. Apparatus for heating dielectric materials comprising first and second platens between which dielectric materials may be placed to be heated, a radio frequency oscillator, first and second conductor leads connecting the output of said oscillator to said first and second platens respectively, said first conductor lead comprising a tubular conductor, first and second electrical heating elements associated with said first and second platens respectively, a source of electric current for energizing said heating elements, third and fourth conductor leads extending through said tubular conductor and connecting said source of electrical current to said first heating element, each of said third and fourth conductor leads having a radio frequency choke in series with said first heating element, first and second capacitors connected between said first conductor lead and said third and fourth conductor leads respectively, said capacitors being connected to said third and fourth conductor leads between said first electrical heating element and the adjacent end of said chokes, third and fourth capacitors connected between said second conductor lead and said third and fourth leads respectively, said third and fourth capacitors being connected to said third and fourth leads between the opposite ends of said chokes and said source of electrical current, and fifth and sixth conductor leads connecting said second electrical heating element to said third and fourth conductor leads respectively.

8. Apparatus for heating dielectric materials comprising first and second platens between which dielectric materials may be placed to be heated, a first conductor lead connecting the high potential side of the output circuit of said oscillator to said first platen, a second conductor lead connecting the low potential side of the output circuit of said oscillator to said second platen, a source of electrical current, first and second electrical heating elements, a radio frequency choke connected in series between said first electrical heating element and said source of electrical current, a first capacitor connecting said first conductor lead to one side of said choke, a second capacitor connecting said second conductor lead to the other side of said choke, and means connecting said second electrical heating element to said source of electrical current in parallel to said first electrical heating means.

9. Apparatus for heating dielectric materials as defined by claim 8, further including a second choke connected in series with said first electrical heating means, said first choke being on one side and said second choke being on the other side of said electrical heating means.

10. Apparatus for heating dielectric materials comprising first and second platens between which dielectric materials may be placed to be heated, a radio frequency oscillator, means coupling the high potential side of the output circuit of said oscillator to said first platen, means connecting the low potential side of the output circuit of said oscillator to said second platen, first and second electrical heating means associated with said first and second platens respectively, a source of electrical current, means including a high frequency electrical choke coupling said source of electrical current to said first heating means, means coupling said second electrical heating means to said source of electrical current in parallel to said first heating means, a first capacitor connecting one end of said choke to the high potential side of the output circuit of said oscillator, and a second capacitor connecting the opposite end of said choke to the low potential side of the output circuit of said oscillator.

11. Apparatus for heating dielectric materials as defined by claim 10, wherein the inductance of said radio frequency choke in parallel with the platen capacitance has a fundamental frequency lower than the operating frequency of said oscillator.

References Cited in the file of this patent

UNITED STATES PATENTS

| 2,385,567 | Descarsin | Sept. 25, 1945 |
| 2,388,824 | Brown | Nov. 13, 1945 |
| 2,457,659 | Graham et al. | Dec. 28, 1948 |
| 2,508,382 | Gard | May 23, 1950 |
| 2,532,460 | Phillips | Dec. 5, 1950 |
| 2,631,222 | Niebling | Mar. 10, 1953 |

FOREIGN PATENTS

| 558,064 | Great Britain | Dec. 17, 1943 |